(12) United States Patent
Sokolov (10) Patent No.: US 6,996,824 B2
(45) Date of Patent: *Feb. 7, 2006

(54) FRAMEWORKS FOR EFFICIENT REPRESENTATION OF STRING OBJECTS IN JAVA PROGRAMMING ENVIRONMENTS

(75) Inventor: Stepan Sokolov, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 628 days.

This patent is subject to a terminal disclaimer.

(21) Appl. No.: 09/939,325

(22) Filed: Aug. 24, 2001

(65) Prior Publication Data

US 2003/0041181 A1 Feb. 27, 2003

Related U.S. Application Data

(63) Continuation of application No. 09/852,402, filed on May 9, 2001, now Pat. No. 6,751,790.

(51) Int. Cl.
 *G06F 9/44* (2006.01)

(52) U.S. Cl. .................................................. 719/315
(58) Field of Classification Search ................ 719/315, 719/316; 717/116, 118, 114, 148, 146, 139; 718/1; 707/103 R, 103 Y, 103 Z; 341/87, 341/67, 50
See application file for complete search history.

(56) References Cited

U.S. PATENT DOCUMENTS

| 5,444,445 A | * | 8/1995 | Chu ............................. 341/87 |
| 5,579,518 A | | 11/1996 | Yasumatsu |
| 5,608,396 A | * | 3/1997 | Cheng et al. .................. 341/50 |
| 5,664,189 A | | 9/1997 | Wilcox et al. |
| 5,784,069 A | * | 7/1998 | Daniels et al. ............... 345/467 |

(Continued)

FOREIGN PATENT DOCUMENTS

| WO | WO 00/24129 | 4/2000 |
| WO | WO 00/73894 A2 * | 12/2000 |

OTHER PUBLICATIONS

J. Gosling et al., The Java Language Specification, 1996, Sun Microsystems, Inc. pp. 199, 531–547.*
Hopson, K.C., et al., "Developing Professional Java Applets", Sams.net, Publishing, 1996, pp. 326–328, 342–343.*
Kreft et al., "Character types and Character Traits," C++ Report, Apr. 1998.
Chan et al., "The Java Class Libraries, Second Edition, vol. 1," Mar. 9, 1998, Character String p. 1632.
Lindholm et al., "The Java™ Virtual Machine Specification," (Sep., 1996), Sun Microsystems, Inc., Chapters 1–10 (173 pp.).
Examination Report dated Jan. 24, 2005 for Application No. GB0325721.9, Examiner Nikki Dowell, EPO.

*Primary Examiner*—Sue Lao
(74) *Attorney, Agent, or Firm*—Beyer Weaver & Thomas, LLP (57) ABSTRACT

Improved techniques for representation of Java string objects are disclosed. The techniques can be implemented to create Java string objects as arrays of one-byte characters when it is appropriate. To create Java string objects, an enhanced constructor can be provided in a Java library that is available to application programs (or programmers). In addition, enhanced Java methods can also be provided in the Java library. An array representation flag can optionally be allocated in the Java string object representation. The array representation flag can indicate whether the Java string object is allocated as an array of one-byte or an array of two-byte characters. Alternatively, the element type of the array can be referenced by using one or more references to determine whether the Java string object has been allocated as an array of one-byte or as an array of two-byte characters.

21 Claims, 5 Drawing Sheets

U.S. PATENT DOCUMENTS

| | | | |
|---|---|---|---|
| 5,793,381 A | * 8/1998 | Edberg et al. | 345/467 |
| 5,875,335 A | 2/1999 | Beard | |
| 5,923,878 A | * 7/1999 | Marsland | 717/139 |
| 5,966,702 A | * 10/1999 | Fresko et al. | 707/1 |
| 6,003,038 A | * 12/1999 | Chen | 707/103 R |
| 6,018,628 A | * 1/2000 | Stoutamire | 717/147 |
| 6,049,869 A | * 4/2000 | Pickhardt et al. | 712/300 |
| 6,166,666 A | * 12/2000 | Kadyk | 341/87 |
| 6,263,496 B1 | * 7/2001 | Meyer et al. | 717/114 |
| 6,400,287 B1 | * 6/2002 | Ehrman | 341/55 |
| 6,421,681 B1 | * 7/2002 | Gartner et al. | 707/103 R |
| 6,557,023 B1 | * 4/2003 | Taivalsaari | 718/1 |
| 6,658,625 B1 | * 12/2003 | Allen | 715/523 |
| 6,711,576 B1 | * 3/2004 | Tuck et al. | 707/100 |
| 6,751,790 B2 | * 6/2004 | Sokolov et al. | 717/148 |
| 2004/0001010 A1 | * 1/2004 | Shaylor et al. | 341/50 |

* cited by examiner

FRAMEWORKS FOR EFFICIENT REPRESENTATION OF STRING OBJECTS IN JAVA PROGRAMMING ENVIRONMENTS

CROSS-REFERENCE TO RELATED APPLICATIONS

This application is a continuation of the U.S. patent application Ser. No. 09/852,402, filed May 9, 2001 now U.S. Pat. No. 6,751,790, entitled "FRAMEWORKS FOR EFFICIENT REPRESENTATION OF STRING OBJECTS IN JAVA PROGRAMMING ENVIRONMENTS," which is hereby incorporated herein by reference for all purposes.

BACKGROUND OF THE INVENTION

The present invention relates generally to object-based high level programming environments and, more particularly, to techniques for representing string objects in object-based computing environments.

Recently the Java programming environment has become quite popular. The Java programming language is a language that is designed to be portable enough to be executed on a wide range of computers ranging from small devices (e.g., pagers, cell phones and smart cards) up to supercomputers. Computer programs written in the Java programming language (and other languages) may be compiled into Java Bytecode instructions that are suitable for execution by a Java virtual machine implementation.

The Java virtual machine is commonly implemented in software by means of an interpreter for the Java virtual machine instruction set but, in general, may be software, hardware, or both. A particular Java virtual machine implementation and corresponding support libraries together constitute a Java runtime environment.

Computer programs in the Java programming language are arranged in one or more classes or interfaces (referred to herein jointly as classes or class files). Such programs are generally platform, i.e., hardware and operating system, independent. As such, these computer programs may be executed without modification on any computer that is able to run an implementation of the Java runtime environment.

Object-oriented classes written in the Java programming language are compiled to a particular binary format called the "class file format." The class file includes various components associated with a single class. These components can be, for example, methods and/or interfaces associated with the class. In addition, the class file format can include a significant amount of ancillary information that is associated with the class. The class file format (as well as the general operation of the Java virtual machine) is described in some detail in *The Java Virtual Machine Specification, Second Edition*, by Tim Lindholm and Frank Yellin, which is hereby incorporated herein by reference.

As an object-oriented programming language, Java utilizes the programming concept known as an object. In the Java programming environment, Java objects are created (instantiated) from Java classes. One common Java object is the Java string object which can represent a string of one or more characters. Conventionally, representation of each character in the string requires two bytes of data to be used. Thus, Java string objects are represented in arrays of two-byte characters (i.e., a series of entries where each entry contains a two-byte value representing a character).

As will be appreciated, the conventional representation of Java objects is inefficient since there is not always a need to represent strings in arrays of two-byte characters. In fact, the conventional approach can be grossly inefficient since, in most cases, there may not be a need to represent strings in arrays of two-byte characters. Thus, the conventional representation of Java string objects can seriously hinder the performance of a virtual machine, especially those with relatively limited resources (e.g., embedded systems with relatively smaller memory and computing power).

In view of the foregoing, alternative techniques for representation of Java string objects are needed.

SUMMARY OF THE INVENTION

Broadly speaking, the present invention relates to improved techniques for representing string objects in an object-oriented environment. The techniques are especially useful for representing Java objects in Java computing environments and can thereby improve the performance of a virtual machine, especially those with operating with relatively limited resources (e.g., embedded systems with relatively smaller memory and computing power).

In accordance with one aspect of the invention, techniques for instantiating Java string objects are disclosed. The techniques can be implemented to create Java string objects as arrays of one-byte characters when it is appropriate. These techniques can be utilized by an enhanced constructor that creates Java objects in an efficient manner. The constructor can be provided in a Java library that is available to application programs (or programmers). An array representation flag can optionally be allocated in the Java string object representation. The array representation flag can indicate whether the Java string object is allocated as an array of one-byte or two-byte characters.

Another aspect of the invention provides for enhanced Java methods that can perform operations on the Java string objects represented as arrays of one-byte characters. The enhanced Java methods can be provided in the Java library. The enhanced Java methods can use the array representation flag to determine whether the Java string object is allocated as an array of one-byte or two-byte characters. Alternatively, in embodiments that do not allocate the array representation flag, the element type of the array is referenced by using one or more references.

The invention can be implemented in numerous ways, including as a method, an apparatus, a computer readable medium, and a database system. Several embodiments of the invention are discussed below.

As a Java computing environment, one embodiment of the invention includes a Java string object representation suitable for representation of a Java string including one or more characters. The Java string is represented in an array of one-byte characters in a memory portion of the Java computing environment. The Java string object representation includes an array representation flag. The array representation flag can be set to a first state to indicate that the Java string represents an array of one-byte characters.

As a method for instantiation of a Java string object, one embodiment of the invention includes the acts of: receiving one or more characters; determining whether an array of one-byte characters or an array of two-byte characters should be allocated to represent the Java string object, allocating an array of one-byte characters to represent the Java string object when it is determined that the Java string object should be allocated as an array of one-byte characters, setting an array representation flag to a first state when it is determined that the Java string object should be allocated as an array of one-byte characters, allocating an array of two-byte characters to represent the Java string object when it is determined that the Java string object should be allocated as an array of two-byte characters, and setting an array representation flag to a second state when it is determined that the Java string object should be allocated as an array of two-byte characters.

As a method of performing one or more operations on a Java string object, one embodiment of the invention includes the acts of: receiving a request to perform an operation on a Java string object; reading an array reference associated with the Java string object, the array reference providing a reference to an array type reference, the array type reference providing a reference to an element type indicator; reading the element type indicator; determining whether the Java string object has been allocated as an array of one-byte characters or as an array of two-byte characters, based on the reading of the element type indicator; and invoking a method suitable for performing the operation on Java string objects that are allocated as arrays of one-byte characters when it is determined that the Java string object has been allocated as an array of one-byte characters.

As a computer readable media including computer program code for a Java library, one embodiment of the invention includes: computer program code for at least one Java constructor suitable for instantiating a Java string object. The computer program code for the at least one Java constructor can operate to allocate a Java string object as an array of one-byte characters. The Java string object representation includes an array representation flag. The array representation flag can be set to a first state to indicate that the Java string represents an array of one-byte characters.

These and other aspects and advantages of the present invention will become more apparent when the detailed description below is read in conjunction with the accompanying drawings.

BRIEF DESCRIPTION OF THE DRAWINGS

The present invention will be readily understood by the following detailed description in conjunction with the accompanying drawings, wherein like reference numerals designate like structural elements, and in which.

DESCRIPTION OF THE INVENTION

As described in the background section, the Java programming environment has enjoyed widespread success. Therefore, there are continuing efforts to extend the breadth of Java compatible devices and to improve the performance of such devices. One of the most significant factors influencing the performance of Java based programs on a particular platform is the performance of the underlying virtual machine. Accordingly, there have been extensive efforts by a number of entities to improve performance in Java compliant virtual machines.

As such, alternative techniques for representation of Java string objects are needed. Broadly speaking, the present invention pertains to improved techniques for representing string objects in an object-oriented environment. The techniques are especially useful for representing Java objects in Java computing environments and can thereby improve the performance of a virtual machine, especially those with operating with relatively limited resources (e.g., embedded systems with relatively smaller memory and computing power).

In accordance with one aspect of the invention, techniques for instantiating Java string objects are disclosed. The techniques can be implemented to create Java string objects as arrays of one-byte characters when it is appropriate. These techniques can be utilized by an enhanced constructor that creates Java objects in an efficient manner. The constructor can be provided in a Java library that is available to application programs (or programmers). An array representation flag can optionally be allocated in the Java string object representation. The array representation flag can indicate whether the Java string object is allocated as an array of one-byte or two-byte characters.

Another aspect of the invention provides for enhanced Java methods that can perform operations on the Java string objects represented as arrays of one-byte characters. The enhanced Java methods can be provided in the Java library. The enhanced Java methods can use the array representation flag to determine whether the Java string object is allocated as an array of one-byte or two-byte characters. Alternatively, in embodiments that do not allocate the array representation flag, the element type of the array is referenced by using one or more references.

Embodiments of the invention are discussed below with reference to FIGS. 1–5B. However, those skilled in the art will readily appreciate that the detailed description given herein with respect to these figures is for explanatory purposes only as the invention extends beyond these limited embodiments.

Figure 1:
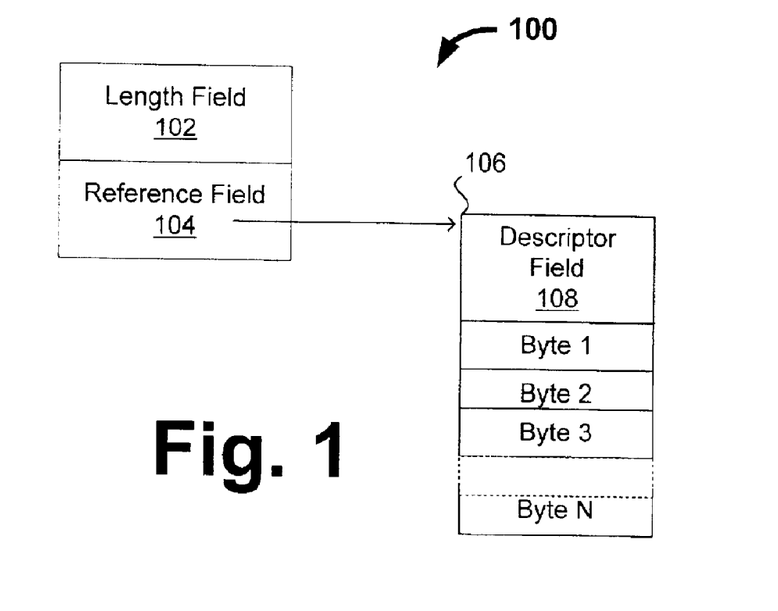
FIG. 1 represents a Java string object in accordance with one embodiment of the invention.

FIG. 1 represents a Java string object 100 in accordance with one embodiment of the invention. The Java string object 100 includes a length field 102 and a reference field 104. The length field 102 represents the length of the characters in the string object. The reference field 104 represents a reference to a memory portion 106 where these characters are stored (e.g., Byte 1–Byte N). As shown in FIG. 1, in addition to the characters stored in Byte 1 through Byte N, the memory portion 106 includes a descriptor field 108. The descriptor field 108 can indicate that this array object is stored as an array of one-byte characters.

As will be appreciated, an application program can allocate Java objects as arrays of one-byte characters in accordance with one embodiment of the invention. Moreover, this can be accomplished without requiring the application program to perform any additional work. In other words, the invention provides for creation of a string object as an array of one-byte characters when appropriate, and without requiring the application program (or Java programmer) to explicitly allocate the string object as an array of one-byte characters. To achieve this and other objectives of the invention, an enhanced Java string constructor is provided in accordance with one embodiment of the invention. The enhanced Java string constructor can be provided in a Java library which may also include one or more enhanced Java string methods suitable for performing various operations on Java string objects that have been allocated as arrays of one-byte characters (i.e., each Java object is represented as an array of one-byte characters).

Figure 2:
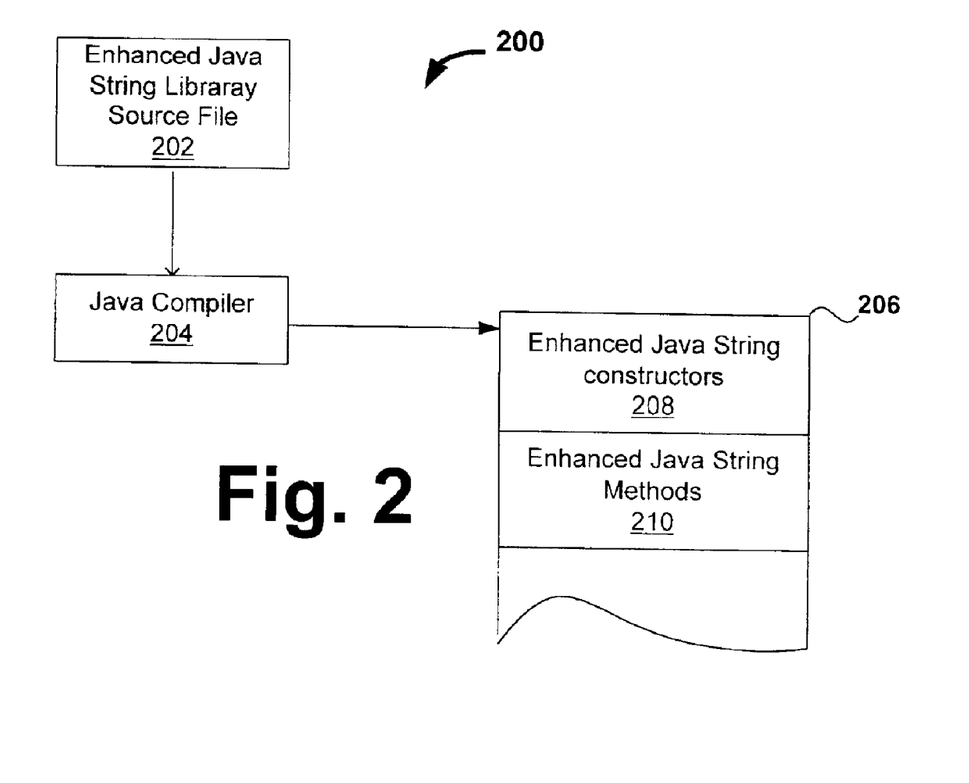
FIG. 2 represents a Java computing environment in accordance with one embodiment of the invention.

To illustrate, FIG. 2 represents a Java computing environment 200 in accordance with one embodiment of the invention. As shown in FIG. 2, the Java computing environment 200 includes an enhanced Java string library source file 202 which is input to a Java compiler 204. The enhanced Java string library source file 202 is compiled by the Java compiler 204 and an enhanced Java string class file 206 is produced which can be provided as a Java library to application programs (or programmers).

The Java string class file 206 can provide one or more constructors 208 suitable for instantiating Java string objects that are allocated as arrays of one-byte characters (i.e., each Java object is represented as an array of one-byte characters). In addition, one or more enhanced Java string methods 210 can be provided in the Java string class file 206. As will be appreciated, the one or more enhanced Java string methods 210 can perform one or more operations on Java string objects represented as arrays of one-byte characters. These operations can include the operations performed by conventional Java string methods operating on Java string objects represented as arrays of two-byte characters. These conventional operations are known to those skilled in the art. In one embodiment, the one or more enhanced Java string methods can perform these operations on Java objects represented as arrays of two-byte characters as well as those objects represented as arrays of one-byte characters.

Figure 3:
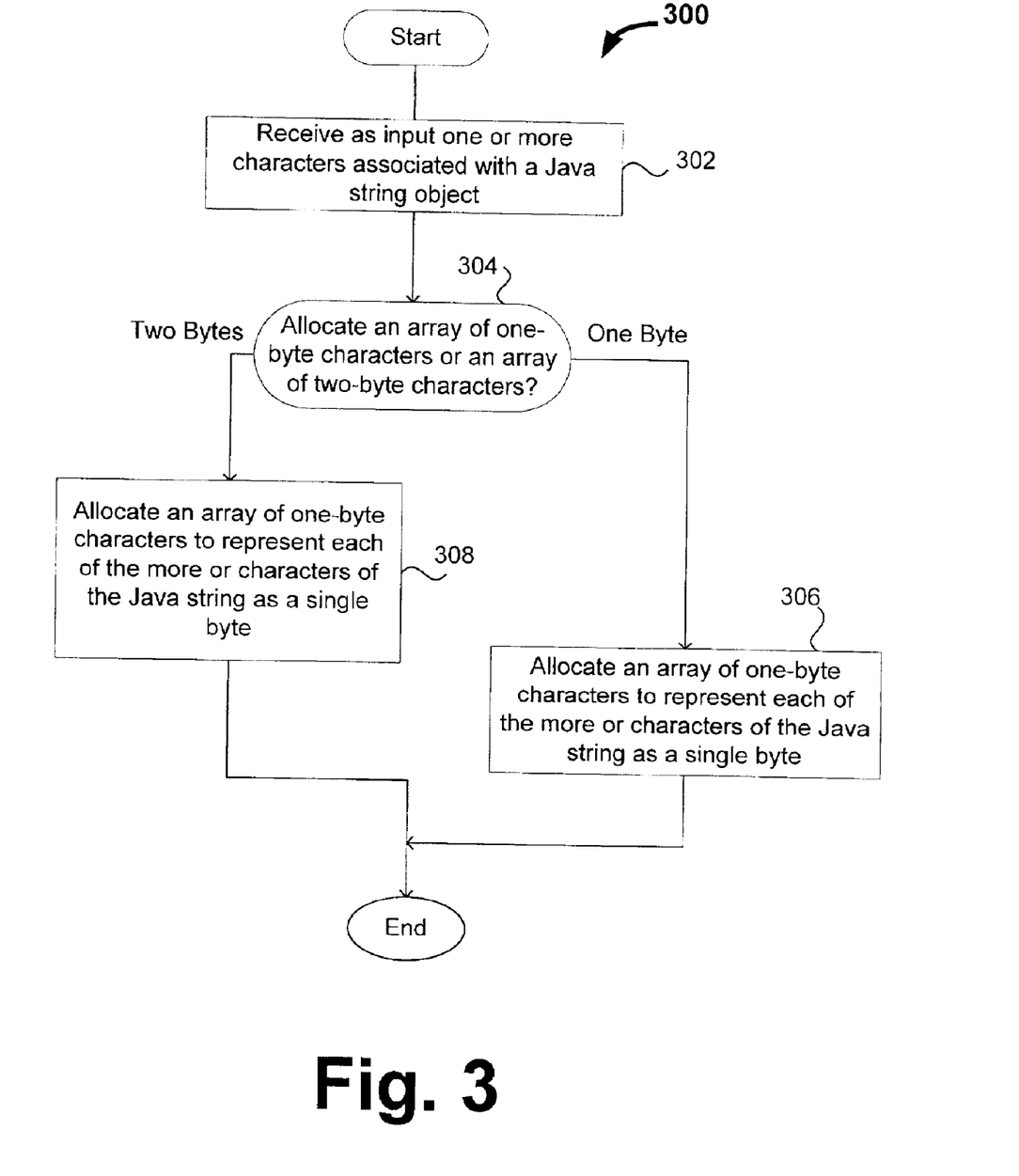
FIG. 3 illustrates a method of instantiating a Java string object in accordance with one embodiment of the invention.

As noted above, an enhanced Java string constructor can be used to instantiate Java string objects. FIG. 3 illustrates a method 300 for instantiating a Java string object in accordance with one embodiment of the invention. As such, the method 300 can, for example, be performed by an enhanced Java string constructor. Initially, at operation 302, one or more characters associated with a Java string object are received as input. These one or more characters can, for example, be provided by an application program that seeks to instantiate a Java string as a string of one or more characters. Next, at operation 304, a determination is made as to whether an array of one-byte characters or an array of two-byte characters should be allocated to represent said Java string object. In one embodiment, a determination is made as to whether all the characters can appropriately be represented in one byte.

If it is determined at operation 304 that an array of one-byte characters should be allocated, the method 300 proceeds to operation 306 where an array of one-byte characters is allocated to represent each of the characters of the Java string as a single byte. The method 300 ends following operation 306. However, if it is determined at operation 304 that an array of two-byte characters should be allocated, the method proceeds to operation 308 where an array of two-byte characters is allocated to represent each of the characters of the Java string in two bytes. The method 300 ends following operation 308.

Figure 4:
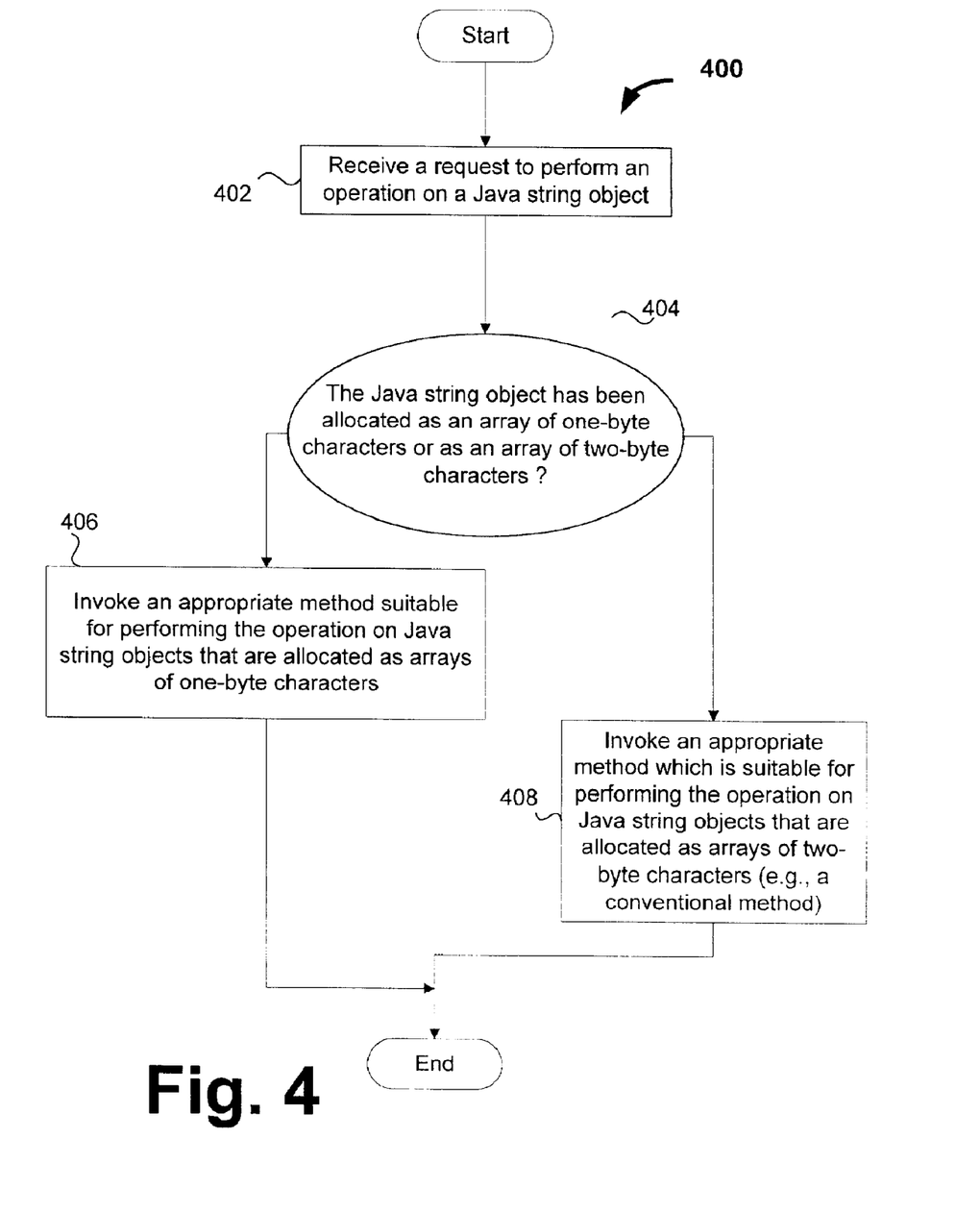
FIG. 4 illustrates a method of performing one or more operations on a Java string object in accordance with one embodiment of the invention.

FIG. 4 illustrates a method of performing one or more operations on a Java string object in accordance with one embodiment of the invention. The method 400 can, for example, be performed by the one or more enhanced Java string methods 210 of FIG. 2. Initially, at operation 402, a request to perform an operation on a Java string object is received. Next, at operation 404, a determination is made as to whether the Java string object has been allocated as an array of one-byte characters or as an array of two-byte characters. In one embodiment, this determination is made by reading a descriptor associated with the array (e.g., descriptor field 108 of FIG. 1).

If it is determined at operation 404 that the Java string object has been allocated as an array of one-byte characters, the method 400 proceeds to operation 406 where an appropriate method suitable for performing the operation on Java string objects that are allocated as arrays of one-byte characters is invoked. However, if it is determined at operation 404 that the Java string object has been allocated as an array of two-byte characters, the method 400 proceeds to operation 408 where an appropriate method suitable for performing the operation on Java string objects that are allocated as arrays of two-byte characters is invoked.

It should be noted that the method invoked in operation 408 can be a conventional method while the method invoked in operation 406 is an enhanced Java method that can operate on Java string objects represented as arrays of one-byte characters. It should also be noted that, in a preferred embodiment, the enhanced Java method can operate on Java string objects represented as arrays of one-byte characters or as arrays of two-byte characters. Thus, only one enhanced Java string method need be invoked to perform the operation on the Java string object. To achieve this, the enhanced Java string method can perform the determination made at operation 404 and then proceed accordingly based on that determination.

Figure 5A:
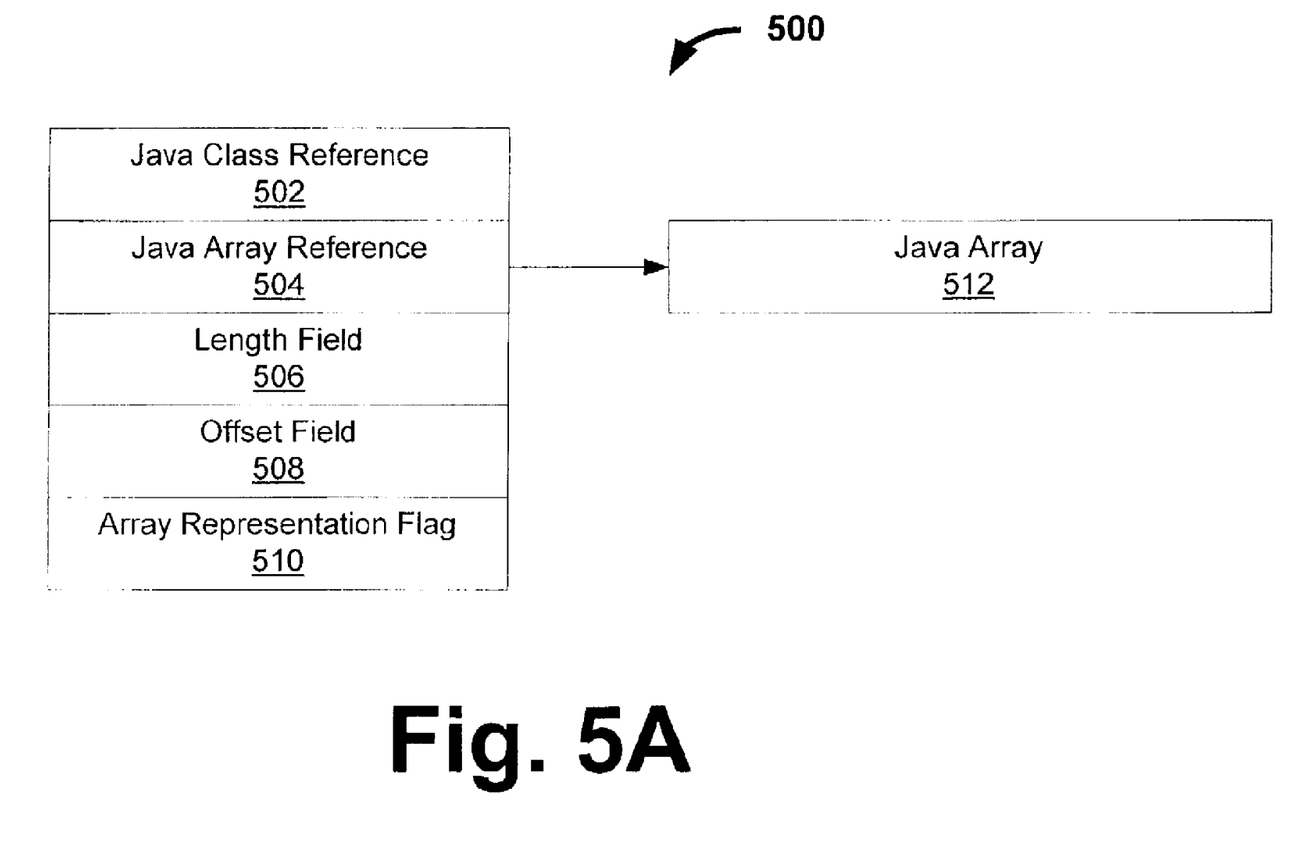
FIGS. 5A and FIG. 5B illustrate Java string object representations in accordance with one embodiment of the invention.

FIG. 5A illustrates a Java string object representation 500 in accordance with one embodiment of the invention. The Java string object representation 500 includes a Java class reference 502, a Java array reference 504, a length field 506, an offset field 508, and an array representation flag 510. The Java class reference 502 represents a reference to a Java class associated with the Java string object. The Java array reference 504 represents a reference to the Java array 512 which is used to represent the Java string object. The length field 506 and an offset field 508 provide the length and the offset of the Java array 512.

It should be noted that an array representation flag 510 can be allocated in accordance with one embodiment of the invention. The array representation flag 510 can be set to a first state to indicate that the Java array 512 is an array of one-byte characters. Accordingly, the array representation flag 510 is set to the first state when the Java array 512 is an array of one-byte characters. When the array representation flag 510 is an array of two-byte characters, the array representation flag 510 can be set to a second state. As will be appreciated, the Java string object representation 500 can enhance runtime performance partly because the array representation flag 510 can quickly be accessed. This means that the determination of whether the array is a one-byte or two-byte array can be performed quickly.

Figure 5B:
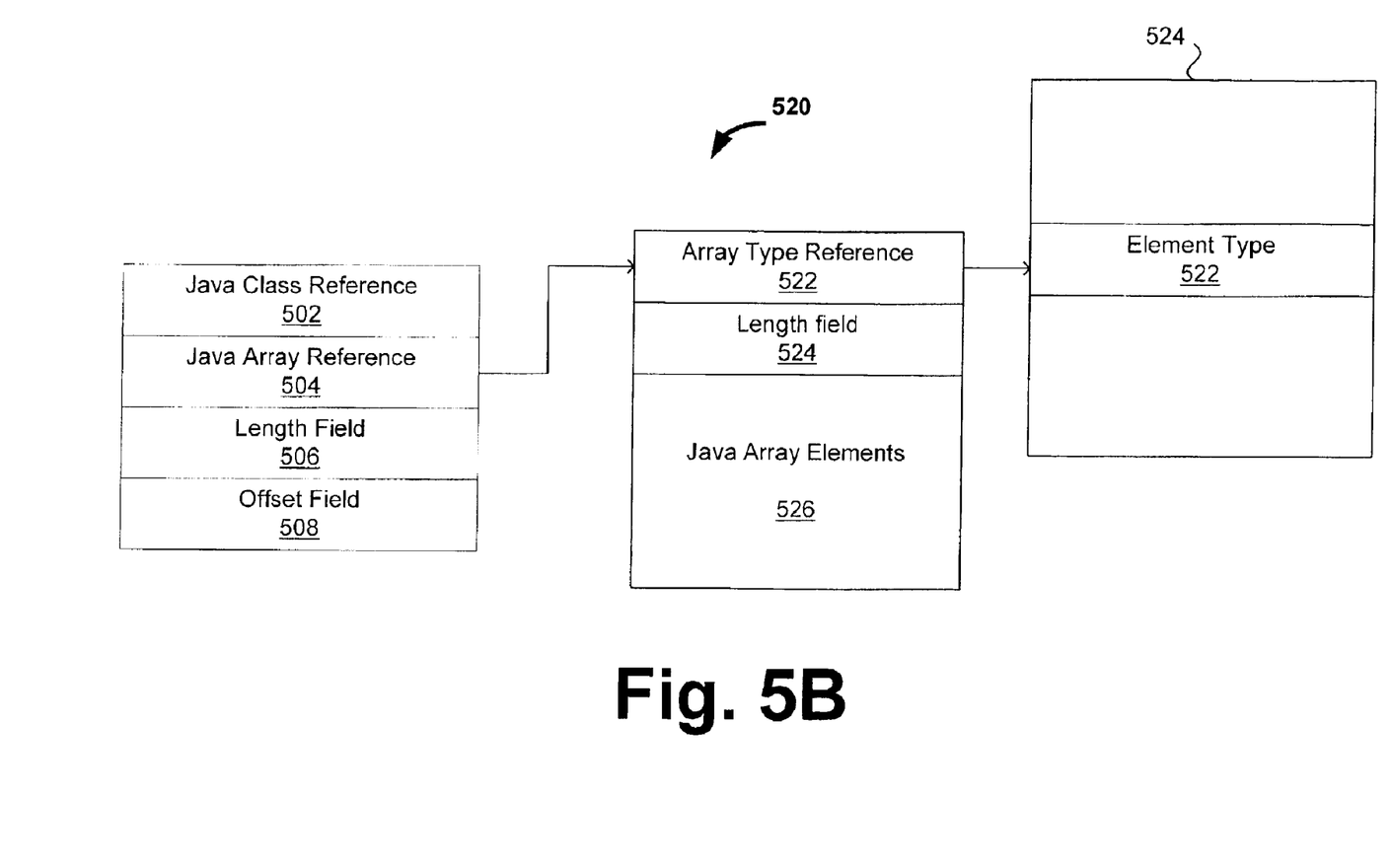

However, in some cases it is desirable to use less memory. FIG. 5B illustrates a Java string object representation 520 in accordance with another embodiment of the invention. Similar to the Java string object representation 500 shown in FIG. 5A, the Java string object representation 520 includes a Java class reference 502, a Java array reference 504, a length field 506, and an offset field 508. However, the Java string object representation 520 does not allocate any memory for an array representation flag (e.g., array representation flag 510). Instead, an array type reference 522 is used to reference an element type 528 in an array type structure 530. The element type 528 can be implemented similar to conventional Java element types. Thus, in cases when the Java array is an array of one-byte, the element type 528 can be set accordingly (e.g., Java Byte type). In this way, a determination can be made as to whether the array has been allocated as an array of one-bytes or an array of two-bytes. Similar to conventional implementations, the array type structure 530 can include other control information about the array.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A Java computing environment, wherein said environment comprises:
   a Java string object representation suitable for representation of a Java string including one or more characters;
   wherein said Java string is represented in an array of one byte characters in a memory portion of said Java computing environment; and
   wherein said Java string object representation includes an array representation flag, said array representation flag being set to a first state to indicate that said Java string represents an array of one byte characters.

2. A Java computing environment as recited in claim 1, wherein said Java string object representation further includes:
   an array reference field, said array reference field being a reference to said array;
   a class field, said class field being a reference to a Java class; and
   a length field, said length representing the length of said array.

3. A Java computing environment as recited in claim 1, wherein said environment further comprises:
   at least one Java constructor suitable for instantiating said Java string object; and
   at least one Java method suitable for performing one or more operations on said Java string object.

4. A Java computing environment as recited in claim 3, wherein said at least one Java constructor and said at least one Java method are provided in a Java library.

5. In a Java programming environment, a computer implemented method of instantiation of a Java string object, said method comprising:
   receiving one or more characters;
   determining whether an array of one-byte characters or an array of two-byte characters should be allocated to represent said Java string object;
   allocating an array of one-byte characters to represent said Java string object when said determining determines that said Java string object should be allocated as an array of one-byte characters;
   setting an array representation flag to a first state when said determining determines that said Java string object should be allocated as an array of one-byte characters;
   allocating an array of two-byte characters to represent said Java string object when said determining determines that said Java string object should be allocated as an array of two-byte characters; and
   setting an array representation flag to a second state when said determining determines that said Java string object should be allocated as an array of two-byte characters.

6. A method as recited in claim 5, wherein said determining is performed by a Java constructor.

7. A method as recited in claim 5, wherein allocation of said string object is performed by a Java constructor.

8. A method as recited in claim 5,
   wherein said determining of whether an array of one-byte characters or an array of two-byte characters should be allocated to represent said Java string object is performed by a Java constructor; and
   wherein allocation of said string object is performed by a Java constructor.

9. A method as recited in claim 5, wherein said Java constructor is provided in a Java library.

10. A method as recited in claim 9, wherein said Java library further comprises:
    one or more Java methods suitable for performing operations on said Java object.

11. In a Java programming environment, a computer implemented method of performing one or more operations on a Java string object, said method comprising:
    receiving a request to perform an operation on a Java string object;
    reading an array reference associated with said Java string object, said array reference providing a reference to an array type reference, said array type reference providing a reference to an element type indicator;
    reading said element type indicator;
    determining, based on said reading of said element type indicator, whether said Java string object has been allocated as an array of one-byte characters or as an array of two-byte characters; and
    invoking a method suitable for performing said operation on Java string objects that are allocated as arrays of one-byte characters when said determining determines that the said Java string object has been allocated as an array of one-byte characters.

12. A method as recited in claim 11,
    wherein said method is also suitable for performing said operation on Java string objects allocated as arrays of two-byte characters, and
    wherein said method is also invoked when said determining determines that the said Java string object has been allocated as an array of two-byte characters.

13. A method as recited in claim 12, wherein said method further comprises:
    invoking another method suitable for performing said operation on Java string objects that are allocated as arrays of two-byte characters when said determining determines that said Java string object has been allocated as an array of two-byte characters.

14. A method as recited in claim 13, wherein said determining of whether a Java string object has been allocated as an array of one-byte characters or as an array of two-byte characters is performed by a Java method.

15. A method as recited in claim 14, wherein said Java method is provided in a Java library.

16. A method as recited in claim 15, wherein said Java library further comprises:
    one or more constructors associated with said Java string object, said one or more constructors being suitable for allocation of said Java string object.

17. A computer readable media including computer program code for a Java library, said computer readable media comprising:
    computer program code for at least one Java constructor suitable for instantiating a Java string object;
    wherein said computer program code for said at least one Java constructor can operate to allocate a Java string object as an array of one-byte characters; and
    wherein said Java string object representation includes an array representation flag, said array representation flag being set to a first state to indicate that said Java string represents an array of one-byte characters.

18. A computer readable media as recited in claim 17, further comprising:

computer program code for at least one Java method, and wherein said program code for said at least one Java method is capable of performing one or more operations on said Java string object represented as an array of one-byte characters.

19. A computer readable media as recited in claim 17, wherein said computer program code for said method is also capable of performing one or more operations on Java string objects represented as arrays of two-byte characters.

20. A virtual machine, wherein said virtual machine is capable of:

receiving a request to perform an operation on a Java string object;

reading an array reference associated with said Java string object, said array reference providing a reference to an array type reference, said array type reference providing a reference to an element type indicator;

reading said element type indicator;

determining, based on said reading of said element type indicator, whether said Java string object has been allocated as an array of one-byte characters or as an array of two-byte characters; and invoking a method suitable for performing said operation on Java string objects that are allocated as arrays of one-byte characters when said determining determines that the said Java string object has been allocated as an array of one-byte characters.

21. A virtual machine for instantiating a Java string object, wherein said virtual machine is capable of:

receiving one or more characters;

determining whether an array of one-byte characters or an array of two-byte characters should be allocated to represent said Java string object;

allocating an array of one-byte characters to represent said Java string object when said determining determines that said Java string object should be allocated as an array of one-byte characters;

setting an array representation flag to a first state when said determining determines that said Java string object should be allocated as an array of one-byte characters;

allocating an array of two-byte characters to represent said Java string object when said determining determines that said Java string object should be allocated as an array of two-byte characters; and setting an array representation flag to a second state when said determining determines that said Java string object should be allocated as an array of two-byte characters.

* * * * *